United States Patent
Shafi et al.

(10) Patent No.: US 8,683,498 B2
(45) Date of Patent: Mar. 25, 2014

(54) SYSTEMS AND METHODS FOR FACILITATING CALL REQUEST AGGREGATION OVER A NETWORK

(75) Inventors: Mohammed Saleem Shafi, Austin, TX (US); Elmustafa E Erwa, Leander, TX (US)

(73) Assignee: eBay Inc., San Jose, CA (US)

( * ) Notice: Subject to any disclaimer, the term of this patent is extended or adjusted under 35 U.S.C. 154(b) by 546 days.

(21) Appl. No.: 12/639,555

(22) Filed: Dec. 16, 2009

(65) Prior Publication Data

US 2011/0145844 A1 Jun. 16, 2011

(51) Int. Cl.
*G06F 9/44* (2006.01)

(52) U.S. Cl.
USPC ............ 719/328; 719/315; 719/330; 707/607

(58) Field of Classification Search
None
See application file for complete search history.

(56) References Cited

U.S. PATENT DOCUMENTS

| | | | | |
|---|---|---|---|---|
| 4,914,653 A * | 4/1990 | Bishop et al. | .................. | 370/462 |
| 5,327,559 A * | 7/1994 | Priven et al. | .................. | 718/101 |
| 5,613,117 A * | 3/1997 | Davidson et al. | ............. | 717/144 |
| 6,058,401 A * | 5/2000 | Stamos et al. | ......................... | 1/1 |
| 6,212,578 B1 * | 4/2001 | Racicot et al. | ................ | 719/330 |
| 6,289,358 B1 * | 9/2001 | Mattis et al. | ................... | 707/695 |
| 6,338,069 B1 * | 1/2002 | Ghatate | .................................. | 1/1 |
| 6,854,116 B1 * | 2/2005 | Anderson et al. | ............. | 718/100 |
| 6,873,995 B2 * | 3/2005 | Laue et al. | .................... | 707/607 |
| 7,680,683 B2 * | 3/2010 | Hilerio et al. | ................. | 705/7.27 |
| 7,936,867 B1 * | 5/2011 | Hill et al. | .................. | 379/265.12 |
| 8,151,282 B2 * | 4/2012 | Carnahan | ....................... | 719/328 |
| 2002/0111922 A1 * | 8/2002 | Young et al. | ..................... | 705/80 |
| 2002/0169658 A1 * | 11/2002 | Adler | .............................. | 705/10 |
| 2003/0033179 A1 * | 2/2003 | Katz et al. | .......................... | 705/7 |
| 2003/0061256 A1 * | 3/2003 | Mathews et al. | .............. | 709/101 |
| 2003/0182624 A1 * | 9/2003 | Large | .............................. | 715/513 |
| 2004/0187089 A1 * | 9/2004 | Schulz | ........................... | 717/101 |
| 2004/0199524 A1 * | 10/2004 | Rys et al. | ....................... | 707/100 |
| 2004/0205110 A1 * | 10/2004 | Hinshaw | ........................ | 709/201 |
| 2005/0033777 A1 * | 2/2005 | Moraes et al. | ................. | 707/202 |
| 2005/0246686 A1 * | 11/2005 | Seshadri et al. | .............. | 717/117 |
| 2006/0004721 A1 * | 1/2006 | Bedworth et al. | ................ | 707/3 |
| 2006/0053157 A1 * | 3/2006 | Pitts | .............................. | 707/102 |
| 2006/0059024 A1 * | 3/2006 | Bailey et al. | ....................... | 705/5 |
| 2006/0161403 A1 * | 7/2006 | Jiang et al. | ......................... | 703/2 |
| 2006/0178954 A1 * | 8/2006 | Thukral et al. | ................... | 705/28 |
| 2006/0225032 A1 * | 10/2006 | Klerk et al. | .................... | 717/105 |
| 2007/0112697 A1 * | 5/2007 | Ricketts | .......................... | 706/12 |
| 2007/0171924 A1 * | 7/2007 | Eisner et al. | ................... | 370/401 |
| 2007/0208587 A1 * | 9/2007 | Sitaraman | ......................... | 705/1 |
| 2009/0100029 A1 * | 4/2009 | Jain et al. | ........................... | 707/4 |

\* cited by examiner

*Primary Examiner* — Andy Ho
*Assistant Examiner* — Shih-Wei Kraft
(74) *Attorney, Agent, or Firm* — Haynes and Boone, LLP

(57) ABSTRACT

A method is disclosed for facilitating electronic commerce over a network includes identifying input dependencies for a call request based on information passed with the call request, identifying state dependencies for the call request based on information passed with the call request, parallelizing calls from the call request based on at least one of the identified input dependencies and the identified state dependencies, developing a service execution map by grouping calls in an execution order including parallelized calls, and processing the service execution map by executing grouped calls in the execution order including parallelized calls.

23 Claims, 7 Drawing Sheets

SYSTEMS AND METHODS FOR FACILITATING CALL REQUEST AGGREGATION OVER A NETWORK

BACKGROUND

1. Technical Field

The present invention generally relates to facilitating electronic commerce over a network and, more particularly, to facilitating call request aggregation over a network.

2. Related Art

In electronic commerce, users typically utilize service providers to process online transactions over communication networks. During the course of these online transactions, users make requests with service calls, such as application programming interface (API) calls, and provide necessary data and information for processing the requests.

Since these requests often involve multiple API calls, the user typically adds latency to the network, which reduces network efficiency. To overcome this problem, conventional processing techniques merge calls into a single batch call. However, even though merging multiple calls into a single batch call may reduce network overhead, this technique may limit the ability for the user to tie calls together and schedule calls efficiently.

As such, there is need to improve network data management and reduce network latency by overcoming the deficiencies of conventional call processing techniques.

SUMMARY

Embodiments of the present disclosure provide systems and methods for facilitating electronic commerce including call request aggregation over a network. In one aspect, the systems and methods are adapted to aggregate or group multiple call requests selected by users and process the call requests in parallel, when possible. In another aspect, the systems and methods are adapted to utilize known or available data to automatically provide input for subsequent calls and intelligently organize (e.g., via a matrix or map) calls for execution to improve speed, efficiency, and usability.

According to an embodiment of the present disclosure, a system and method for facilitating electronic commerce over a network include receiving a call request from a user via communication with a user device over the network, identifying one or more input dependencies for the call request based on information passed with the call request, identifying one or more state dependencies for the call request based on information passed with the call request including, in one aspect, meta-data related to the calls, parallelizing calls from the call request based on at least one of the identified input dependencies and the identified state dependencies, developing a service execution map by grouping calls in an execution order including parallelized calls, processing the service execution map by executing grouped calls in the execution order including parallelized calls, and returning responses to the user for the executed calls. In one implementation, identifying one or more state dependencies for the call request is based on information passed with the call request and the semantics of the call.

In various implementations, the call request may include a batch call having multiple calls grouped together in a batch, and the service execution map may be developed based on a list of call requests in the batch call. In one aspect, input dependencies may refer to the dependence of data for a present call on data from a previous call, identifying the input dependencies may allow automatic population of dependent data for a present call with data from a previous call, and input dependencies may affect the concurrency of call execution. In another aspect, state dependencies may refer to the behavioral affect of present call data on data for a subsequent call, state dependencies may be semantic, state dependencies may be defined between at least two operations, and state dependencies may have shared data. In another aspect, state dependencies may refer to a dependent call occurring after executing at least one other call, and if two calls have an input dependency on the same data, then the two calls may have a shared input dependency. In still another aspect, calls having an input dependency and a state dependency may be executed in sequence, and calls having no input dependencies or no state dependencies may be executed in parallel.

In various implementations, the system and method may include batching invocation patterns based on the identified input dependencies, the identified state dependencies, and/or the parallelized calls, wherein batching invocation patterns refers to populating data for a present call with data from a previous call. The service execution map may be developed based on the identified input dependencies, the identified state dependencies, and/or the parallelized calls. In one aspect, developing the service execution map may include initializing a group number, identifying empty fields in the call request, locating missing data if empty fields are identified by searching one or more previous calls in the call request, analyzing the input dependencies, identifying a source call, analyzing a call list, analyzing the state dependencies, and assigning calls to a group. The service execution map may be processed based on one or more dependency definitions defined by the identified input dependencies, the identified state dependencies, and/or the parallelized calls.

These and other aspects of the present disclosure will be more readily apparent from the detailed description of the embodiments set forth below taken in conjunction with the accompanying drawings.

Figure 1:
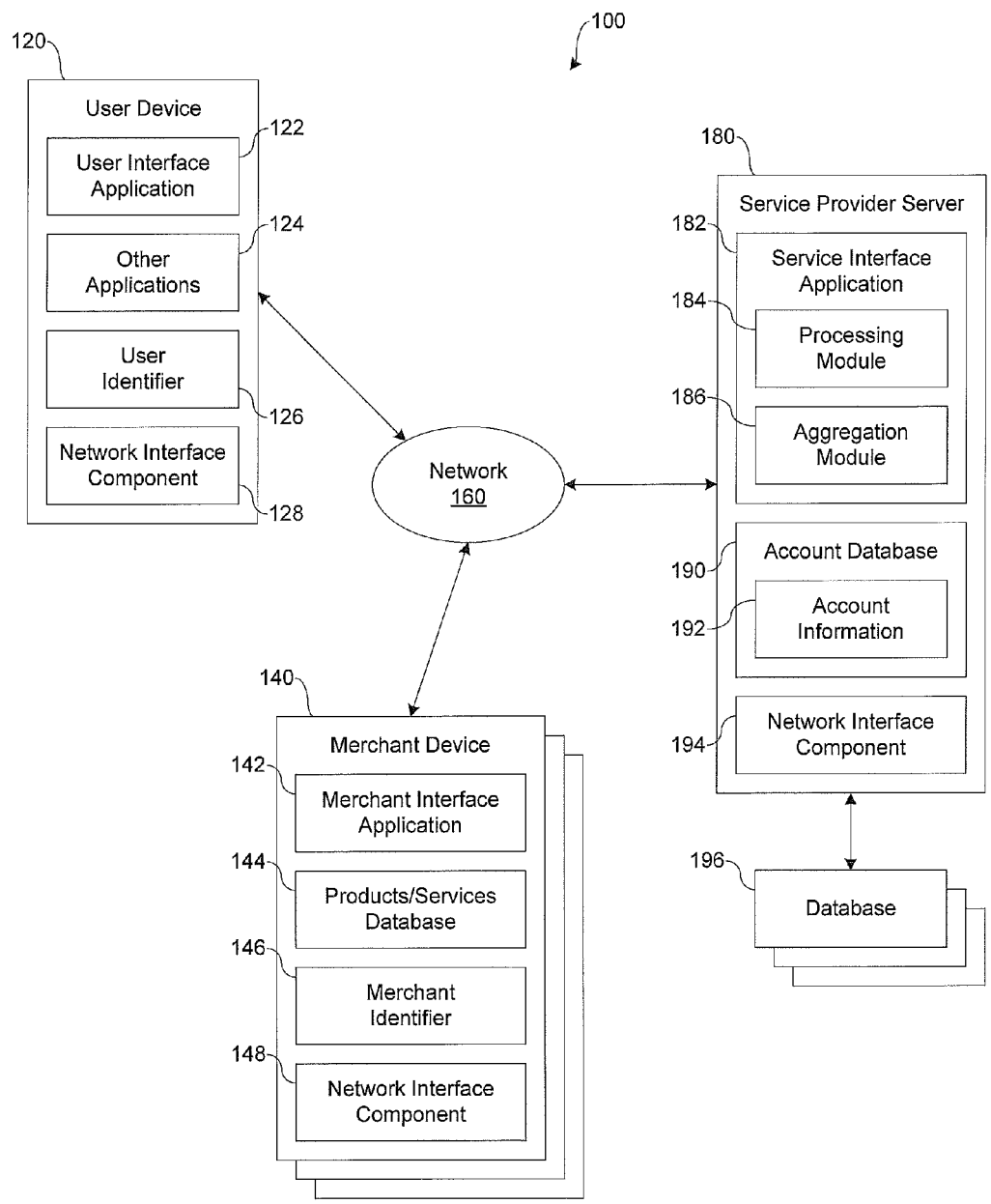
FIG. 1 shows a block diagram of a system adapted to facilitate electronic commerce over a network, in accordance with embodiments of the present disclosure.

Embodiments of the invention and their advantages are best understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Embodiments of the present disclosure provide systems and methods for facilitating electronic commerce including call request aggregation over a network. In various aspects, multiple call requests may be aggregated or grouped together, and the calls may be processed in parallel, when possible. In various other aspects, known or available data may be used to automatically provide input for subsequent calls, and the calls may be intelligently organized (e.g., via a matrix or map) to improve efficiency, speed, and usability.

By analyzing a set of call requests in a batch call, service data may be automatically tied together, and an optimal execution plan may be mapped so that integration is efficient and user-friendly. For example, a user may make a service request using a list of service request objects. The user may tie request and/or response values together by, e.g., leaving the one or more fields empty, and a server may analyze the set of call requests and develop a service execution map.

During analysis, input dependencies may be identified, wherein when a field is left null in any request other than the first request, any previous request and/or response objects may be searched for matching values. In one aspect, this creates an input dependency between the request and/or response and the subsequent partial request. In another aspect, the first request may not include a partial request.

During analysis, state dependencies may be identified, wherein when a request has an input dependency on another request and/or response or shares an input dependency with another request, the operations may be related in such a manner that the first operation changes state when used by the second, or vice versa. In one aspect, state dependencies may be described by meta-data on the server-side. In another aspect, state dependencies include is static data that may be derived from the semantics of the operation In one implementation, call requests that have an input and a state dependency should be run in sequence. In another implementation, call requests that have no input dependencies or no state dependencies may be run in parallel. In some cases, call requests may not be reordered to resolve dependencies, and/or responses may be returned to match the original order of the associated request. These and other aspects of the present disclosure are described in greater detail herein.

FIG. 1 shows one embodiment of a system 100 for facilitating electronic commerce including call request aggregation, over a network 160, such as the Internet and/or a mobile communication network. As shown in FIG. 1, the system 100 includes a user device 120 (e.g., a client or customer device) adapted to interface with one or more merchant devices 140 (e.g., business entities proffering items, products, and/or services for purchase), and a service provider 180 (e.g., a network based transaction service provider, such as a payment and settlement transaction provider) over the network 160.

The network 160, in one embodiment, may be implemented as a single network or a combination of multiple networks. For example, the network 160 may include a wireless telecommunications network (e.g., cellular telephone network) adapted for communication with one or more other communication networks, such as the Internet. In other examples, the network 160 may include the Internet, one or more intranets, landline networks, wireless networks, and/or one or more other appropriate types of communication networks. As such, in various implementations, the user device 120, the one or more merchant devices 140, and the service provider server 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In one embodiment, the user device 120 may be implemented as a mobile communication device (e.g., wireless cellular phone) adapted for communication with the network 160. In other embodiments, the user device 120 may be implemented as a personal computer (PC), a personal digital assistant (PDA), a notebook computer, and/or various other generally known types of wired and/or wireless computing devices for communication with the network 160. It should be appreciated that the user device 120 may be referred to as a client device or a customer device without departing from the scope of the present disclosure.

The user device 120, in one embodiment, includes a user interface application 122, which may be utilized by a user to conduct network based financial transactions (e.g., remote network based electronic commerce) with the one or more merchant devices 140 and/or the service provider server 180 over the network 160. The user interface application 122 may be implemented as a mobile commerce application to initiate, track, manage, and store data and information related to remote network based electronic commerce for viewing, searching, and/or purchasing items, products, and/or services over the network 160. In one aspect, the user device 120 may be linked to an account with the service provider 180 for direct and/or automatic settlement of purchase requests between a user and the one or more merchant devices 140 via the user interface application 122.

In one embodiment, the user interface application 122 comprises a software program, such as a graphical user interface (GUI), executable by a processor that is configured to interface and communicate with the one or more merchant devices 140 and/or the service provider server 180 via the network 160. In one aspect, the user interface application 122 comprises a browser module adapted to provide a network interface to browse information available over the network 160. For example, the user interface application 122 may be implemented, in part, as a web browser to view and search information available over the network 160. In another example, the user is able to access merchant websites of the one or more merchant devices 140 over the network 160 to view, search, and select items, products, and/or services for purchase, and the user is able to purchase selected items, products, and/or services from the one or more merchant devices 140 via the service provider server 180. As such, the user may conduct network based financial transactions (e.g., electronic commerce) with the one or more merchant devices 140 via the service provider server 180.

In one implementation, upon user instruction, the user interface application 122 may be installed and/or run on the user device 120. A user may run the user interface application 122 on the user device 120 to access the service provider server 180 via the network 160. In one aspect, upon installation and/or execution of the user interface application 122, the user may be prompted to establish a user account for login with the service provider server 180, wherein the user may use the user interface application 122 and the user device 120 to access the service provider server 180 via the network 160. When establishing a user account, the user may be asked to provide personal information, such as name, address, phone number, etc., and financial information, such as banking information, credit card information, etc. In another aspect, referring to FIG. 1, information related to the user may be packaged as the user identifier 126.

The user device 120, in various embodiments, may include other applications 124 as may be desired in one or more embodiments of the present disclosure to provide additional features available to the user. In one example, such other applications 124 may include security applications for implementing user-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience. In one example, files, data, and/or information may be imported from various types of accounting software (e.g., a spreadsheet application) directly into the user interface application 122 for improved tracking of payments and settlements related to purchases via the network 160. Accordingly, it should be appreciated that the user interface application 122 and each of the other applications 124 are adapted to make API calls over the network 160.

The user device 120, in various embodiments, may include a user identifier 126, which may be implemented, for example, as operating system registry entries, cookies associated with the user interface application 122, identifiers associated with hardware of the user device 120, and/or various other appropriate identifiers. The user identifier 126 may include one or more attributes related to the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier 126 may be passed with user transaction requests to the service provider server 180 via the network 160, and the user identifier 126 may be utilized by the service provider server 180 to associate the user with a particular user account maintained by the service provider server 180.

The user device 120, in one embodiment, may include a network interface component (NIC) 128 adapted for communication with the network 160. In various implementations, the network interface component 128 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 160. In various other implementations, the network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The one or more merchant devices 140, in one embodiment, may be implemented using any appropriate combination of hardware and/or software configured for wired and/or wireless communication over the network 160. In various implementations, the merchant devices 140 may be implemented as a network server, a personal computer (PC), a personal digital assistant (PDA), a notebook computer, and/or various other generally known types of wired and/or wireless computing devices for communication with the network 160. In another implementation, the merchant device 140 may be implemented as a mobile device (e.g., a wireless cellular phone) adapted for communication with the network 160.

In another embodiment, the one or more merchant devices 140 may be maintained as one or more network servers by one or more business entities (e.g., merchant sites, resource information sites, utility sites, real estate management sites, social networking sites, etc.) offering various items, products, and/or services for purchase and payment, which may need registration of user identity information as part of offering the items, products, and/or services to one or more users over the network 160. Accordingly, each of the one or more merchant devices 140 may comprise at least one network based server in communication with the network 160 having a merchant interface application 142 and a products/services database 144 for presenting and identifying one or more available items, products, and/or services for purchase via the network 160, which may be made available to the user device 120 for viewing and purchase by the user. In one aspect, each of the network based merchant servers may be accessible via a mobile communication device (e.g., wireless cellular phone) for management purposes. For example, each merchant entity may have the ability to remotely access and interact with their own network based merchant server via a mobile communication device for management purposes.

In one embodiment, each of the merchant devices 140 includes the merchant interface application 142, which may be utilized by the one or more merchant devices 140 to conduct network based financial transactions (e.g., remote network commerce, such as shopping, purchasing, bidding, etc.) with one or more users and/or the service provider server 180 over the network 160. For example, the merchant interface application 142 may be implemented as an electronic commerce application to initiate, track, manage, and store information related to remote network based commerce for the viewing, searching, and purchasing of items, products, and/or services over the network 160. In one implementation, each of the merchant devices 140 may be linked to an account with the service provider 180 for direct and/or automatic settlement of purchase requests between the each merchant 140 and one or more users via the merchant interface application 142.

In one implementation, the merchant interface application 142 comprises a software program, such as a GUI, executable by a processor that is configured to interface and communicate with one or more users and/or the service provider server 180 via the network 160. In another implementation, the merchant interface application 142 comprises a network interface module that makes information available to the user device 120 over the network 160. For example, the merchant interface application 142 may be implemented, in part, as a website manager to provide, list, and present information to the user device 120 via the network 160. In another example, each merchant 140 is capable of providing one or more network based merchant websites to allow viewing, searching, and selecting of items, products, and/or services for purchase by the user via the user device 120, and the user is able to purchase items, products, and/or services from the one or more merchant devices 140 via the merchant websites and the service provider server 180. As such, each of the merchant devices 140 may conduct financial transactions with the user via the merchant interface application 142 and the service provider server 180.

In various implementations, the merchant interface application 142 may include a marketplace application, which may be configured to provide transaction information related to the products and/or services database 144 to the user interface application 122 of the user device 120 via the network 160. For example, the user may interact with the merchant 140 via the marketplace application through the user interface application 122 over the network 160 to search and view various items, products, and/or services available for purchase from the products/services database 144. The marketplace application may include a checkout module, which may be configured to facilitate online financial transactions by the user of items, products, and/or services identified by each merchant server 140 for purchase. In one aspect, the checkout module of the marketplace application may be configured to accept payment from the user over the network 160 and process the payment via interaction with the service provider server 180.

In one implementation, upon merchant instruction, the merchant interface application 142 may be installed and/or run on the merchant devices 140. A merchant may run the merchant interface application 142 on the merchant device 140 to access the service provider server 180 via the network 160. In one aspect, upon installation and/or execution of the merchant interface application 142, the merchant may be prompted to establish a merchant account for login with the service provider server 180, wherein the merchant may use the merchant interface application 142 and the merchant device 140 to access the service provider server 180 via the network 160. When establishing a merchant account, the merchant may be asked to provide business information, such as business name, address, phone number, etc., and financial information, such as banking information, credit card information, etc. In another aspect, referring to FIG. 1, information related to the merchant may be packaged as the merchant identifier 146.

In various implementations, the merchant interface application 142 may include one or more other applications as may be desired to provide additional features available to the merchant. Other applications may include security applications for implementing user-side security features, programmatic applications for interfacing with appropriate application programming interfaces (APIs) over the network 160, and/or various other types of generally known programs and/or software applications. In another example, files, data, and/or information may be imported from various types of accounting software (e.g., a spreadsheet application) directly into the merchant interface application 142 for improved tracking of payments and settlements related to electronic commerce via the network 160. Accordingly, it should be appreciated that the merchant interface application 142 and any other application may be adapted to make API calls over the network 160.

Each of the merchant devices 140, in various embodiments, may include at least one merchant identifier 146, which may be included as part of the one or more items, products, and/or services made available for purchase so that, e.g., particular items, products, and/or services are associated with particular merchant devices 140. In one implementation, the merchant identifier 146 may include one or more attributes and/or parameters related to the merchant, such as business and/or banking information. For example, the merchant identifier 146 may be passed from a particular merchant 140 to the service provider server 180 when the user selects an item, product, and/or service for hold, monitor, and/or purchase from the particular merchant 140. The merchant identifier 146 may be used by the service provider server 180 to associate particular items, products, and/or services selected for purchase with a particular merchant account maintained by the service provider server 180. As described in greater detail herein, the user may conduct financial transactions (e.g., selection, monitoring, purchasing, and/or providing payment for items, products, and/or services) with each merchant server 140 via the service provider server 180 over the network 160.

In various embodiments, each of the one or more business entities having a related merchant server 140 may need to establish at least one merchant account with the service provider server 180. When establishing a merchant account, each of the one or more business entities may need to provide business information, such as owner name, owner address, social security number, date of birth, phone number, email address, etc., and financial information, such as banking information, merchant account information, credit card information, payment processing information, etc.

Each of the merchant devices 140, in various embodiments, includes a network interface component (NIC) 148 adapted for communication with the network 160. In various implementations, the network interface component 148 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 160. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider server 180, in one embodiment, may be maintained by an online transaction processing entity, which may provide processing for online financial transactions and/or online information transactions on behalf of the user device 120 and/or one or more of the merchant devices 140. As shown in FIG. 1, the service provider server 180 includes a service interface application 182, which may be adapted to interact with the user device 120 and/or each merchant 140 over the network 160 to facilitate electronic commerce including call request aggregation. In one example, a financial transaction may include the selection, purchase, and/or payment of items, products, and/or services by the user device 120 from one or more of the merchant devices 140. In one embodiment, the service provider server 180 may be provided by PayPal, Inc. and/or eBay of San Jose, Calif., USA.

The service interface application 182, in one embodiment, is adapted to utilize a processing module 184 to process purchases and/or payments for financial transactions between the user device 120 and each of the merchant devices 140. In one implementation, the processing module 184 is adapted to resolve financial transactions through validation, delivery, and settlement. For example, the service interface application 182 in conjunction with the processing module 184 is adapted to settle indebtedness between the user device 120 and each of the merchant devices 140, wherein accounts may be directly and/or automatically debited and/or credited of monetary funds in a manner as accepted by the banking industry.

The service interface application 182, in one embodiment, is adapted to utilize an aggregation module 186 to aggregate or group multiple call requests (e.g., API calls) selected by users and process the call requests in parallel, when possible. In one implementation, the aggregation module 186 is adapted to utilize known or available data to automatically provide input for subsequent call requests and intelligently organize (e.g., via a matrix or map) call requests to improve efficiency and speed. For example, multiple call requests may be grouped into a single call request, and individual call requests may be processed in parallel, when possible. In another example, known or available information may be utilized to automatically input information in a next call request. In another example, call requests may be processed or called in any order, and the call requests may be intelligently organized (e.g., by a matrix or map) for execution. As a result, the execution process may be efficient, faster, and user-friendly. These and other aspects related to call request aggregation is described in greater detail herein.

The service application 182, in one embodiment, may be adapted to utilize a selection processing module to process and monitor user selection events during online shopping by the user via the user device 120. In one aspect, the selection processing module allows the service provider server 180 to process and monitor user selections during online navigation and shopping events over the network 160. For example, the service provider server 180 interfaces with the user device 120 via, e.g., a browser window to monitor the user and the user device 120 during navigation and shopping events on various merchant sites. The selection processing module may be used by the service provider server 180 to monitor user selections of one or more items, products, and/or services.

The service provider server 180, in one embodiment, may be configured to maintain one or more user accounts and merchant accounts in an account database 190, each of which may include account information 192 associated with one or more individual users and the one or more merchant devices 140. For example, account information 192 may include private financial information of the user and each merchant 140, such as one or more account numbers, passwords, credit card information, banking information, or other types of financial information, which may be used to facilitate online financial transactions between the user and the one or more merchant devices 140. In various implementations, the methods and systems described herein may be modified to accommodate additional users and/or additional merchants that may or may not be associated with at least one existing user account and/or merchant account, respectively.

In one implementation, the user and/or user device 120 may have identity attributes stored with the service provider server 180 as the user identifier 126, and the user and/or user device 120 may have credentials to authenticate or verify identity with the service provider server 180. In one aspect, user attributes may include personal information and banking information, as previously described. In other aspects, the user attributes may be passed to the service provider server 180 as part of a login and/or transaction request, and the user attributes may be utilized by the service provider server 180 to associate the user and/or the user device 120 with one or more particular user accounts in the account database 190 maintained by the service provider server 180.

In another implementation, each of the merchants and/or merchant devices 140 may have identity attributes stored with the service provider server 180 as merchant identifiers 146, and each of the merchant devices 140 may have credentials to authenticate or verify identity with the service provider server 180. In one aspect, merchant attributes may include business information and banking information, as previously described. In other aspects, the merchant attributes may be passed to the service provider server 180 as part of a login and/or transaction request, and the merchant attributes may be utilized by the service provider server 180 to associate each of the merchant devices 140 with one or more merchant accounts in the account database 190 maintained by the service provider server 180.

The service provider server 180, in various embodiments, may include a network interface component (NIC) 194 adapted for communication with the network 160 and any network based communication devices including the network interface component 128 of the user device 120 and the network interface component 148 of each merchant 140. In various implementations, the network interface component 194 of the service provider server 180 may include a wireless communication component, such as a wireless broadband component, a wireless satellite component, or various other types of wireless communication components including radio frequency (RF), microwave frequency (MWF), and/or infrared frequency (IRF) components adapted for communication with the network 160. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider server 180, in various embodiments, may include one or more databases 196 (e.g., internal and/or external databases) for storing and tracking information related to financial transactions between particular users, such as the user, the one or more merchant devices 140, and the service provider server 180. In one implementation, the databases 196 may provide a historical survey of transactions between the user device 120, the one or more merchant devices 140, and the service provider server 180. For example, the service interface application 182 may be adapted to monitor, track, log, and store transaction information related to network based electronic commerce between the user device 120, each merchant 140, and/or the service provider server 180, and the stored transaction information is accessible from the databases 196 for analysis, maintenance, and settlement.

Figure 2A:
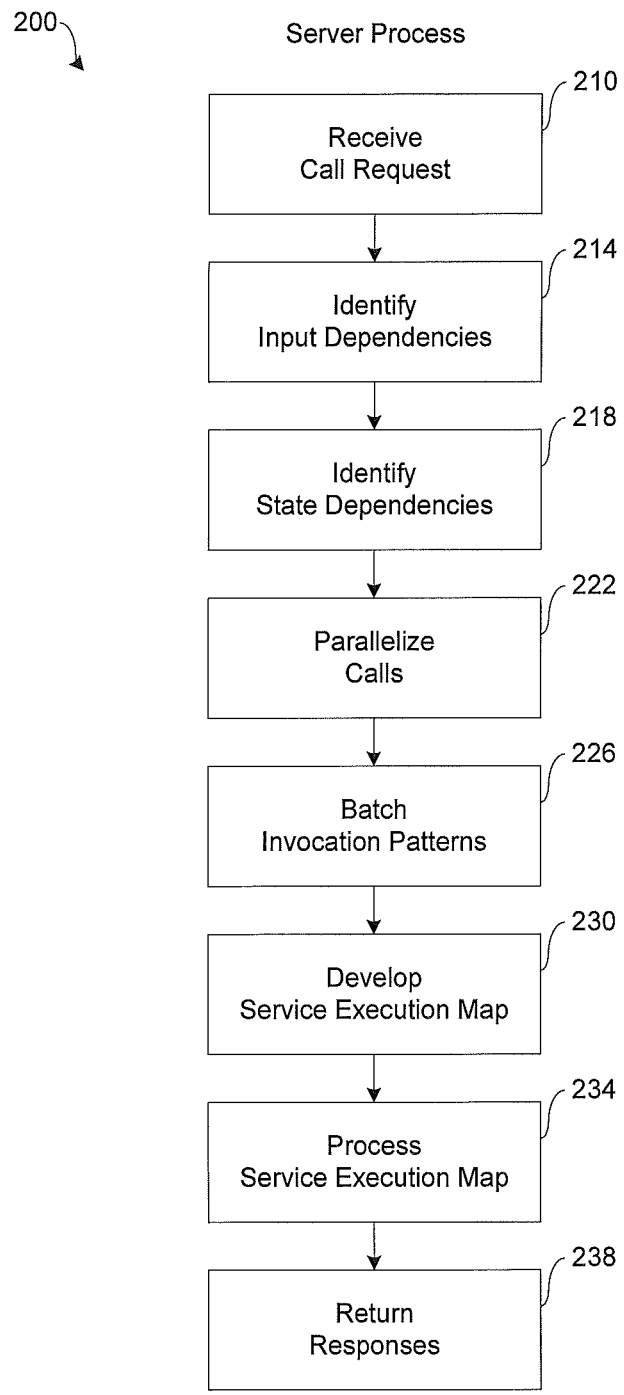
FIG. 2A shows a method for facilitating call request aggregation over a network, in accordance with embodiments of the present disclosure.

FIG. 2A shows one embodiment of a method 200 for facilitating electronic commerce including facilitating call request aggregation over the network 160. It should be appreciated that, for purposes of explanation, the method 200 of FIG. 2A is discussed in reference to FIG. 1, but should not be limited thereto.

Referring to FIG. 2A, the service provider server 180 is adapted to receive a call request over the network 160 (block 210). In one embodiment, the call request may include a batch call, which may include multiple calls grouped together in a batch.

In one implementation, the method 200 facilitates a server-side process over the network 160 in response to a user call request via the user device 120 and the user interface application 122. In another implementation, the method 200 facilitates a server-side process over the network 160 in response to a merchant call request via one or more of the merchant devices 140 and the merchant interface application 142. In various implementations, the service provider server 180 is adapted to process call requests over the network 160 on behalf of a user via the user device 120 and/or merchants via the merchant devices 140.

The service provider server 180 is adapted to identify one or more input dependencies for the call request based on information passed with the call request (block 214). In one implementation, input dependencies refer to situations where the request data of one call depends on data from a previous call, either from the request or the response. In one aspect, identifying the input dependencies allows the dependent operation to be automatically populated with the data from the prior call, which may reduce the need for the user to wire these calls together. In another aspect, input dependencies may affect the ordering and/or the concurrency of the calls.

Figure 3A:
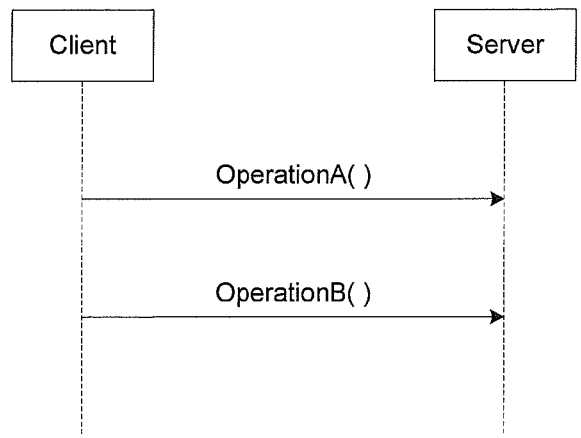
FIGS. 3A-3C show various examples of executing call requests, in accordance with embodiments of the present disclosure.

For example, in reference to FIG. 3A, if OperationB( ) needs data from OperationA( ), then OperationB( ) should be called after OperationA( ) is processed.

In another example, OperationA( ) may return a field, which is needed in the request of one or more subsequent calls, such as OperationB( ). Accordingly, there is an input dependency between OperationA( ) and OperationB( ).

Figure 3B:
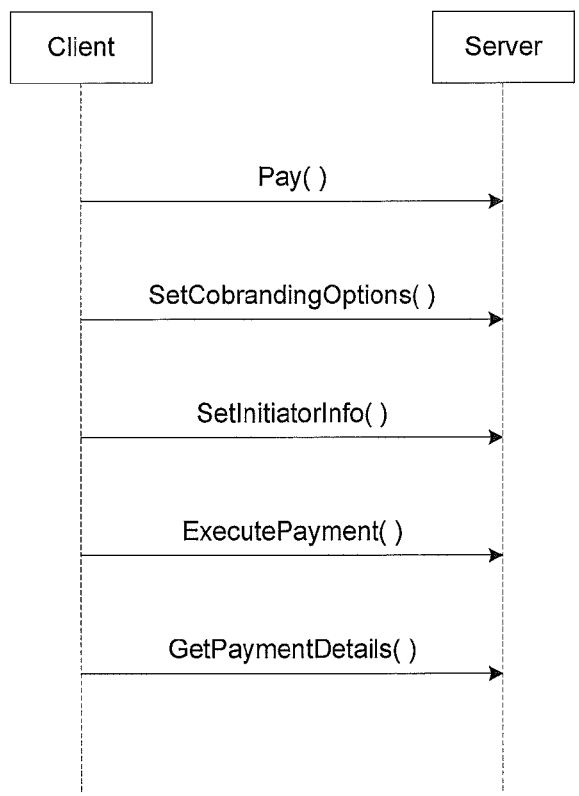

In a payments example, in reference to FIG. 3B, a Pay( ) call may return a payKey field, which is needed in the call request of one or more subsequent calls. As such, there may be an input dependency between one or more subsequent calls or operations, e.g., between a SetCobrandingInfo( ) call, a ExecutePayment( ) call, and/or the Pay( ) call.

Referring to FIG. 2A, the service provider server 180 is adapted to identify one or more state dependencies for the call request based on information passed with the call request (block 218). In one implementation, information passed with the call request includes meta-data related to the calls. In another implementation, state dependencies occur when the behavior of one call may affect the behavior of a subsequent call. The state dependencies are semantic and may be defined between any two operations, regardless of the data. However, the state dependency may only be meaningful if there is some shared data in the input, either through a regular input dependency or a shared input dependency.

In one aspect, a state dependency refers to a dependent call that should occur after processing the one or more calls that it is dependent on. In another aspect, if two calls both have an input dependency on the same piece of data, then there is a shared input dependency between the two calls. As such, the shared input dependency affect may trigger the behavior related to the state dependencies, but it may not force synchronous execution since the data required to invoke the call is available for both calls at the same time.

In one example, referring to FIG. 3B, a state dependency may occur between a SetCobrandingOptions( ) call, a SetInitiatorinfo( ) call, and an ExecutePayment( ) call. The ExecutePayment( ) call may have a shared dependency with the SetCobrandingOptions( ) call and the SetInitiatorinfo( ) call since all three calls may need a payKey field provided by a Pay( ) call. Since the two Set( ) calls may modify a paymentRequest field that is needed by the ExecutePayment( ) call, there exists a state dependency. As such, in one aspect, the state dependency refers to a dependent call that should occur after processing of the one or more calls that it is dependent on.

Referring to FIG. 2A, the service provider server 180 is adapted to parallelize calls (block 222) from the call request based on the identified input dependencies (block 214) and/or the identified state dependencies (block 218).

In one implementation, if there is no identified input dependency (as opposed to a shared dependency) or no identified state dependency, then the two or more calls may be executed in parallel.

Figure 3C:
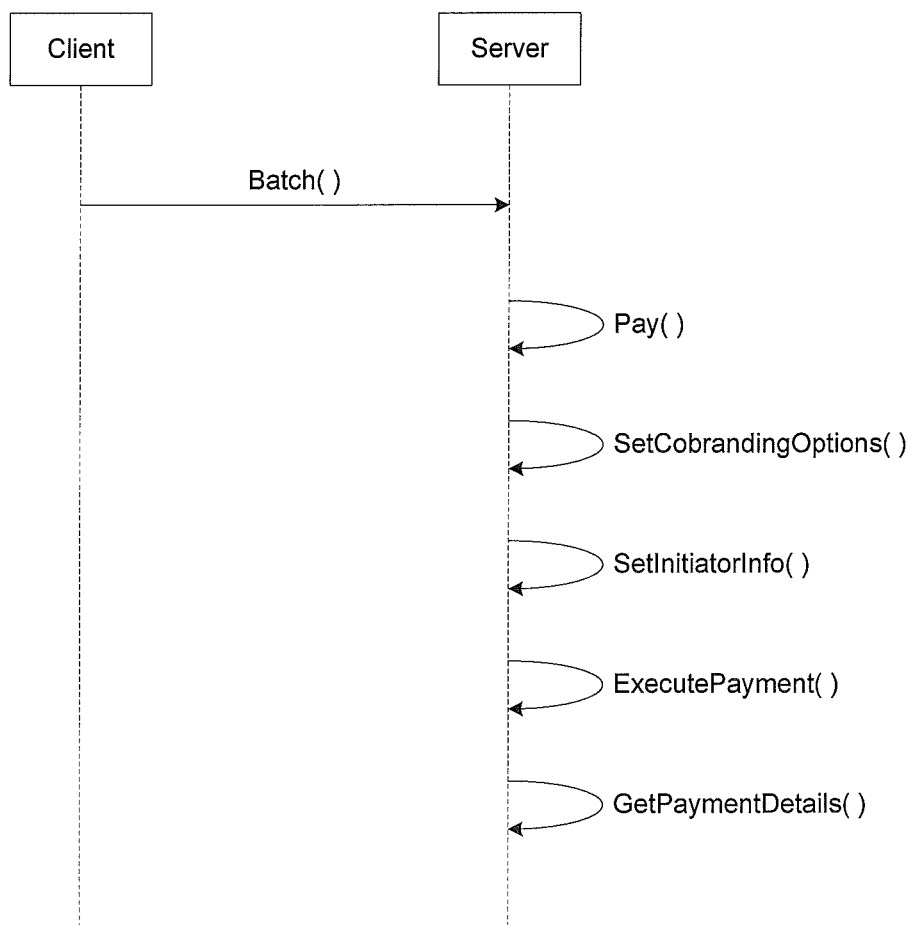

In one example, FIG. 3C shows a process of executing operations in a Batch( ) call synchronously, wherein each operation is synchronously processed after completing the previous operation. As shown, the Pay( ) call is executed, then the SetCobrandingOptions( ) call is executed, then the SetInitiatorinfo( ) call is executed, then the ExecutePayment( ) call is executed, and then the GetPaymentDetails( ) is executed.

Figure 3D:
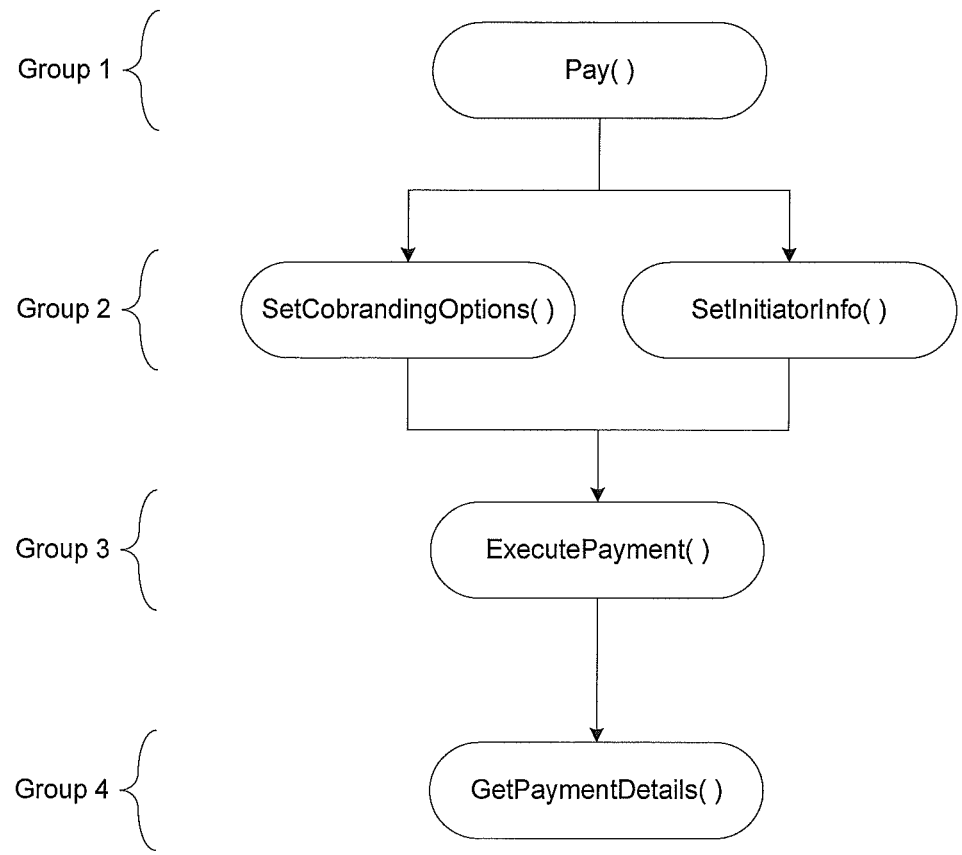
FIG. 3D shows a process for executing call requests in parallel, in accordance with embodiments of the present disclosure.

In another example, referring to parallelizing calls (block 222), FIG. 3D shows a process for executing one or more operations of the Batch( ) call in parallel. As shown, the Pay( ) call is executed, and then the SetCobrandingOptions( ) call and the SetInitiatorinfo( ) call are grouped together and executed simultaneously. Next, the ExecutePayment( ) call is executed, and then the GetPaymentDetails( ) is executed.

In one implementation, call requests that have either an input dependency or a state dependency should be run in sequence (i.e., synchronously). In another implementation, call requests that have no input dependencies or no state dependencies may be run in parallel. In some cases, call requests may not be reordered to resolve dependencies, and/or responses may be returned to match the original order of the associated request.

For example, call requests that may have an input dependency include the Pay( ) call, and the GetPaymentDetails( ) call, which may need a payKey field from the Pay( ) call.

In another example, call requests that may have a state dependency include the Pay( ) call, the SetPaymentOptions( ) call, which may need the payKey field from the Pay( ) call, and the ExecutePayment( ) call, which may need the payKey field from the Pay( ) call and may be affected by state change from the SetPaymentOptions( ) call.

In another example, call requests that may be parallelizable (i.e., calls with no input dependencies) include the GetPaymentDetails( ) call, which may run simultaneously with other GetPaymentDetails( ) calls when each call is for a different payKey field.

In another example, call requests that may be parallelizable (i.e., calls with input dependencies, but no state dependencies) include the Pay( ) call, the SetCobrandingOptions( ) call, which may need the payKey field from the Pay( ) call, and the SetInitiatorInfo( ) call, which may need the payKey field from the Pay( ) call, but may not be affected by any state change from the SetCobrandingOptions( ) call.

In another example, call requests that may be parallelizable (i.e., calls with input dependencies and state dependencies) include the ExecutePayment( ) call, which may need the payKey field from the Pay( ) call and may be affected by any state changes from one or more previous calls.

Referring to FIG. 2A, the service provider server 180 is adapted to batch invocation patterns based on the identified input dependencies, the identified state dependencies, and/or the parallelized calls (block 226).

In one implementation, since input dependencies are based on data that the user provides, the user has to express the dependency. In the case where the dependent data is needed to populate a necessary field, it should be enough for the user to simply leave that field empty. However, in some cases, since an empty field may not be considered a valid request, the user may be indicating that the necessary data is unavailable at the time of the request, but the necessary data may be available from another part of the batch call.

In one example, a JSON-based Batch( ) request may appear as follows.

```
{ "calls": [
    { "Pay" :
        { "sender":"me@paypal.com", "receiver":"you@paypal.com",
          amount:"10.00", currency:"USD" } },
    { "SetCobrandingOptions" : {
      "headerImg": "http://www.paypalpics.com/123" }
} ] }
```

In one aspect, the SetCobrandingOptions( ) call may fail without the payKey field. In this case, the payKey field may be available from somewhere else. For example, the payKey field may be returned from the Pay( ) call, which may then be used.

In some instances, extra information may be needed from the client, and a simple name-value pair that identifies both source and target fields may suffice.

For example, a Preapproval( ) call may be added somewhere in the batch call, which may appear as follows.

```
{ "calls": [ ... ],
  "inputs": [ {
      "source":"Preapproval[0].response.preapprovalKey",
      "target":"Pay[0].preapprovalKey" } ] }
```

Referring to FIG. 2A, the service provider server 180 is adapted to develop a service execution map for processing (block 230). In one aspect, the service provider server 180 is adapted to develop the service execution map by grouping calls in an execution order, which may include calls that have been grouped together for execution in parallel.

In one implementation, parallelizing calls on the server-side may include identifying state dependencies and developing a service execution map based on that data and a list of call requests in the Batch( ) call. In one aspect, an operation state dependency graph provides static information that may be assembled into code that is adapted to describe one or more operations for execution. It should be appreciated that the state dependencies may be described in either direction of process flow, whichever makes sense for maintaining this data as new operations are added.

Once that directed graph is defined, it may be used to schedule a list of calls in the Batch( ) call. The basic logic may be provided as follows.

Figure 2B:
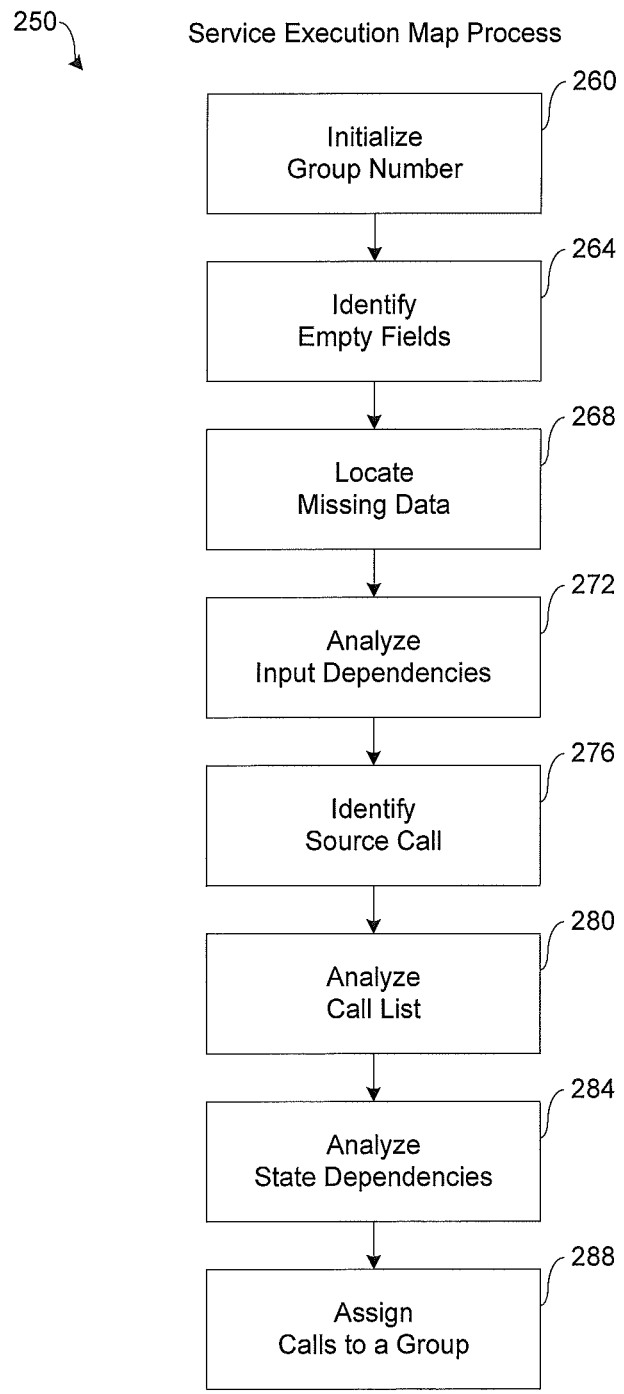
FIG. 2B shows a method for developing a service execution map, in accordance with embodiments of the present disclosure.

For example, FIG. 2B shows one embodiment of a method 250 for developing a service execution map for each call in a batch.

In one implementation, a group number may be initialized (block 260). For example, a group number of zero may be used to initialize or start the process.

Empty fields may be identified (block 264). For example, the call may be analyzed to determine if the call is missing a necessary field.

If empty fields are identified (block 264), then missing data may be located (block 268). For example, if the call is missing a necessary field, then one or more previous calls may be searched for the necessary data, and the call with the highest group number may be chosen.

Input dependencies may be analyzed (block 272). For example, a list of explicit input dependencies may be searched through and identified.

A source call may be identified (block 276). For example, in each call that references the call with the highest group number, the source call with the highest group number may be identified.

A call list may be analyzed (block 280). For example, a list of calls in the group with the highest group number and any subsequent groups may be search through and analyzed.

State dependencies may be analyzed (block 284). For example, if any calls in the call list have a state dependency with the present call, then the group number for those calls is taken.

Calls may be assigned to a group (block 288). For example, the call may be assigned to a group with the present call. In one aspect, the calls assigned to the group may be set for execution in parallel. In some groups, all calls in the group may be executed in parallel.

In one implementation, referring to FIG. 3D, a JSON-based Batch( ) request may appear as follows.

```
{ "calls": [
   { "Pay" :
      { "sender":"me@paypal.com", "receiver":"you@paypal.com",
```

-continued

```
        amount:"10.00", currency:"USD" } },
   { "SetCobrandingOptions" : {
        "headerImg":"http://www.paypalpics.com/123" },
   { "SetInitiatorInfo": {"initiatorName":"Someone Else" } },
   { "ExecutePayment": { } },
   { "GetPaymentDetails": { } },
   { "GetInitiatorInfo": { } }
} ] }
```

In one aspect, all of the calls, except for Pay( ) may need the payKey field, but in this case, the payKey field returned by the Pay( ) call is used, which may leave the last three calls with an empty field.

Referring to FIG. 2A, after developing the service execution map (block 230), the service provider server 180 is adapted to process the service execution map (block 234). In one aspect, the service execution map may be processed by executing grouped calls in the execution order including parallelized calls.

In one embodiment, the service execution map may be processed based on the following dependency definitions:
    affects-state.Pay=
    affects-state.SetCobrandingOptions=
    affects-state.SetInitiatorinfo=
    affects-state.ExecutePayment=Pay,SetCobrandingOptions,SetInitiatorInfo
    affects-state.GetPaymentDetails=Pay,ExecutePayment In one implementation, the previously listed JSON-based Batch( ) request referring to FIG. 3D may be processed based on the dependency definitions as follows.

For example, the Pay( ) call may be automatically added to a first execution group (e.g., group 1), since there may be no existing dependencies related thereto.

With the SetCobrandingOptions( ) call, a required payKey field may be recognized as missing, so there may exist an input dependency. Since the Pay( ) call in group 1 may be able to provide the required payKey field, the SetCobrandingOptions( ) call may be added to a second execution group (e.g., group 2).

Since the SetInitiatorinfo( ) call may have an input dependency that the Pay( ) call may be able to provide, the SetInitiatorinfo( ) call may be added to group 2 along with the SetCobrandingOptions( ) call. However, in one aspect, a check may be needed to determine whether the SetInitiatorinfo( ) call has a state dependency on the SetCobrandingOptions( ) call in group 2. If the affects-state.SetInitiatorinfo list is empty, then the SetInitiatorinfo( ) call may be safely added to group 2. As shown in FIG. 3D, the SetCobrandingOptions( ) call and the SetInitiatorinfo( ) call may be executed in parallel.

Since the ExecutePayment( ) call has an input dependency satisfied by the Pay( ) call, the ExecutePayment( ) call may be added to group 2. However, the ExecutePayment( ) call should be checked for state dependencies. Since affects-state.ExecutePayment includes the SetCobrandingOptions( ) call and the SetInitiatorinfo( ) call, which are in group 2, the ExecutePayment( ) call should be moved to group 3.

Since the GetPaymentDetails( ) call has an input dependency satisfied by the Pay( ) call, the GetPaymentDetails( ) call may be added to group 2. However, in one aspect, the affects-state.GetPaymentDetails reveals that the GetPaymentDetails( ) call does not have a dependency on calls in group 2, but the GetPaymentDetails( ) call does have a dependency on the ExecutePayment( ) call in group 3. Therefore, the GetPaymentDetails( ) call should be moved to group 4.

In one embodiment, as shown in FIG. 3D, the following groups may be developed in the service execution map for processing:

Group 1 includes the Pay( ) call;
Group 2 includes the SetCobrandingOptions( ) call and the SetInitiatorinfo( ) call, which may be executed in parallel;
Group 3 includes the ExecutePayment( ) call; and
Group 4 includes the GetPaymentDetails( ) call.

Referring to FIG. 2A, after developing the service execution map (block 230) and processing the service execution map (block 234), the service provider server 180 is adapted to return one or more responses (block 238). In one aspect, responses may be returned to the user for each of the executed calls.

In various implementations, responses may be returned in the same order as the original call requests. Errors may be returned in order, but execution of the batch calls may cease once an error occurs. Requests in the same group may be completed, so that multiple errors occurring in calls within the same group may be reported. Once a group is finished, subsequent groups may not be continued.

Figure 4:
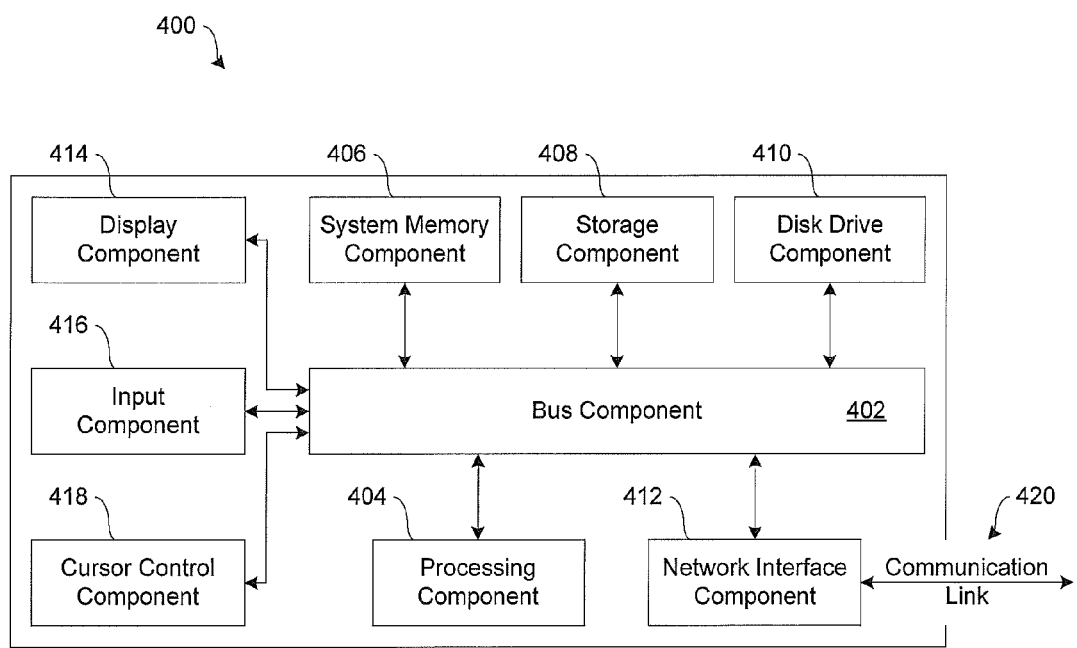
FIG. 4 is a block diagram of a computer system suitable for implementing one or more embodiments of the present disclosure.

FIG. 4 shows a block diagram of a computer system 400 suitable for implementing embodiments of the present disclosure. Computer system 400 includes a bus 402 or other communication mechanism for communicating information, which interconnects subsystems and components, such as processing component 404 (e.g., processor, micro-processor, micro-controller, digital signal processing (DSP) device), system memory component 406 (e.g., RAM), static storage component 408 (e.g., ROM), disk drive component 410 (e.g., magnetic or optical), network interface component 412 (e.g., modem, Ethernet card, wireless transceiver), display component 414 (e.g., CRT or LCD), input component 416 (e.g., keyboard), and cursor control component 418 (e.g., mouse or trackball).

In accordance with embodiments of the present disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement embodiments of the present disclosure.

Logic may be encoded in a computer readable medium, which may refer to any medium that participates in providing instructions to processor 404 for execution. Such a medium may take many forms, including but not limited to, non-volatile media and volatile media. In various implementations, non-volatile media includes optical or magnetic disks, such as disk drive component 410, and volatile media includes dynamic memory, such as system memory component 406. It should be appreciated that data and information related to instructions may be transmitted to computer system 400 via various types of transmission media, such as coaxial cables, copper wire, and fiber optics, including wires that comprise bus 402. In various examples, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the systems and methods described herein may be performed by computer system 400. In various other embodiments of the present disclosure, a plurality of computer systems 400 coupled by communication link 420 (e.g., LAN, wireless LAN, wireless network) may perform instruction sequences to practice the systems and methods described herein in coordination with one another.

Computer system 400 may transmit and receive messages, data, information and instructions, including one or more programs (i.e., application code) through communication link 420 and network interface component 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for facilitating electronic commerce over a network, the method comprising:
   receiving a call request from a user via communication with a user device over the network;
   identifying one or more input dependencies for the call request based on information passed with the call request;
   identifying one or more state dependencies for the call request based on information passed with the call request including meta-data related to the calls request;
   parallelizing calls from the call request based on at least one of the identified input dependencies and the identified state dependencies;

developing a service execution map by grouping calls in an execution order including parallelized calls, wherein the developing comprises identifying an empty field in the call request, searching one or more previous calls for data necessary for the empty field, and selecting a call having the data necessary with a highest group number, wherein a group number is set to zero when starting the service execution map;

processing the service execution map by executing grouped calls in the execution order including parallelized calls comprising a call to identify a payment sender identifier, a payment recipient identifier, a payment amount, and a payment currency, followed by a call to set cobranding options and a call to set an initiator performed in parallel, followed by a call to execute a payment request, followed by call to get payment details; and returning responses to the user for the executed calls.

2. The method of claim 1, wherein:
the call request includes a batch call having multiple calls grouped together in a batch, and
the service execution map is developed based on a list of call requests in the batch call.

3. The method of claim 1, wherein:
input dependencies refer to a dependence of data for a present call on data from a previous call,
identifying the input dependencies allows automatic population of dependent data for a present call with data from a previous call, and
input dependencies affect a concurrency of call execution.

4. The method of claim 1, wherein:
state dependencies refer to a behavioral effect of present call data on data for a subsequent call,
state dependencies are semantic,
state dependencies are defined between at least two operations, and
state dependencies have shared data.

5. The method of claim 1, wherein:
state dependencies refer to a dependent call occurring after executing at least one other call, and
if two calls have an input dependency on a same data, then the two calls have a shared input dependency.

6. The method of claim 1, wherein:
calls having an input dependency or a state dependency are executed in sequence, and
call having no input dependencies or no state dependencies are executed in parallel.

7. The method of claim 1, further comprising:
batching invocation patterns based on at least one of the identified input dependencies, the identified state dependencies, and the parallelized calls,
wherein batching invocation patterns refers to populating data for a present call with data from a previous call.

8. The method of claim 1, wherein:
the service execution map is developed based on at least one of the identified input dependencies, the identified state dependencies, and the parallelized calls.

9. The method of claim 1, wherein developing the service execution map further comprises:
initializing a group number;
analyzing the input dependencies;
identifying a source call;
analyzing a call list;
analyzing the state dependencies; and
assigning calls to a group.

10. The method of claim 1, wherein the service execution map is processed based on one or more dependency definitions defined by at least one of the identified input dependencies, the identified state dependencies, and the parallelized calls.

11. The method of claim 1, wherein:
the network comprises at least one of a mobile communication network and an Internet, and
the user device comprises a mobile communication device including a cellular phone.

12. A system for facilitating electronic commerce over a network, the system comprising:
means for receiving a call request from a user via communication with a user device over the network;
means for identifying one or more input dependencies for the call request based on information passed with the call request;
means for identifying one or more state dependencies for the call request based on information passed with the call request;
means for parallelizing calls from the call request based on at least one of the identified input dependencies and the identified state dependencies;
means for developing a service execution map by grouping calls in an execution order including parallelized calls, wherein the developing comprises identifying an empty field in the call request, searching one or more previous calls for data necessary for the empty field, and selecting a call having the data necessary with a highest group number, wherein a group number is set to zero when starting the service execution map;
means for processing the service execution map by executing grouped calls in the execution order including parallelized calls comprising a call to identify a payment sender identifier, a payment recipient identifier, a payment amount, and a payment currency, followed by a call to set cobranding options and a call to set an initiator performed in parallel, followed by a call to execute a payment request, followed by a call to get payment details; and
means for returning responses to the user for the executed calls.

13. The system of claim 12, wherein:
the call request includes a batch call having multiple calls grouped together in a batch, and
the service execution map is developed based on a list of call requests in the batch call.

14. The system of claim 12, wherein:
input dependencies refer to a dependence of data for a present call on data from a previous call,
means for identifying the input dependencies allows automatic population of dependent data for a present call with data from a previous call, and
input dependencies affect a concurrency of call execution.

15. The system of claim 12, wherein:
state dependencies refer to a behavioral effect of present call data on data for a subsequent call,
state dependencies are semantic,
state dependencies are defined between at least two operations, and
state dependencies have shared data.

16. The system of claim 12, wherein:
state dependencies refer to a dependent call occurring after executing at least one other call, and
if two calls have an input dependency on a same data, then the two calls have a shared input dependency.

17. The system of claim 12, wherein:
calls having an input dependency or a state dependency are executed in sequence, and call having no input dependencies or no state dependencies are executed in parallel.

18. The system of claim 12, further comprising:
means for batching invocation patterns based on at least one of the identified input dependencies, the identified state dependencies, and the parallelized calls,
wherein batching invocation patterns refers to populating data for a present call with data from a previous call.

19. The system of claim 12, wherein:
the service execution map is developed based on at least one of the identified input dependencies, the identified state dependencies, and the parallelized calls.

20. The system of claim 12, wherein means for developing the service execution map comprises:
means for initializing a group number;
means for analyzing the input dependencies;
means for identifying a source call;
means for analyzing a call list;
means for analyzing the state dependencies; and
means for assigning calls to a group.

21. The system of claim 12, wherein the service execution map is processed based on one or more dependency definitions defined by at least one of the identified input dependencies, the identified state dependencies, and the parallelized calls.

22. The system of claim 12, wherein:
the network comprises at least one of a mobile communication network and an Internet, and
the user device comprises a mobile communication device including a cellular phone.

23. A non-transitory computer readable medium on which are stored computer readable instructions and when executed operable to:
receive a call request from a user via communication with a user device over the network;
identify one or more input dependencies for the call request based on information passed with the call request;
identify one or more state dependencies for the call request based on information passed with the call request;
parallelize calls from the call request based on at least one of the identified input dependencies and the identified state dependencies;
develop a service execution map by grouping calls in an execution order including parallelized calls comprising identifying an empty field in the call request, searching one or more previous calls for data necessary for the empty field, and selecting a call having the data necessary with a highest group number, wherein a group number is set to zero when starting the service execution map;
process the service execution map by executing grouped calls in the execution order including parallelized calls comprising a call to identify a payment sender identifier, a payment recipient identifier, a payment amount, and a payment currency, followed by a call to set cobranding options and a call to set an initiator performed in parallel, followed by a call to execute a payment request, followed by a call to get payment details; and
return responses to the user for the executed calls.

* * * * *